(12) United States Patent
Buchan

(10) Patent No.: US 6,413,416 B1
(45) Date of Patent: Jul. 2, 2002

(54) WATER TREATMENT VESSEL WITH CARTRIDGE HOLDER FOR HOLDING TABLETS

(75) Inventor: Leon Buchan, District Brits (ZA)

(73) Assignee: P.P.A. Water Industries, Petoria (ZA)

( * ) Notice: Subject to any disclaimer, the term of this patent is extended or adjusted under 35 U.S.C. 154(b) by 0 days.

(21) Appl. No.: 09/554,563

(22) PCT Filed: Nov. 11, 1998

(86) PCT No.: PCT/GB98/03379
§ 371 (c)(1), (2), (4) Date: Jul. 17, 2000

(87) PCT Pub. No.: WO99/24366
PCT Pub. Date: May 20, 1999

(51) Int. Cl.[7] .................................................. B01D 11/02
(52) U.S. Cl. ...................... 210/97; 210/97; 210/123; 210/198.1; 422/264; 422/282; 137/268
(58) Field of Search ................ 210/121, 123, 210/127, 135, 169, 198.1, 206, 97; 137/268, 393, 395–398; 222/64, 67, 68; 239/310; 422/264, 281, 282, 277, 278

(56) References Cited

U.S. PATENT DOCUMENTS

| | | | |
|---|---|---|---|
| 3,507,624 A | 4/1970 | Schneider et al. | |
| 3,595,786 A | * 7/1971 | Horvath et al. | 210/198.1 |
| 3,612,080 A | * 10/1971 | Schneider et al. | 137/268 |
| 3,638,833 A | 2/1972 | Lucas | |
| 3,846,078 A | 11/1974 | Brett | |
| 3,946,902 A | * 3/1976 | Stepanek | 222/64 |
| 4,208,376 A | 6/1980 | Sangster et al. | |
| 4,250,911 A | 2/1981 | Kratz | |
| 4,303,515 A | 12/1981 | Rademacher | |
| 4,759,907 A | * 7/1988 | Kawolics et al. | 422/264 |
| 4,867,196 A | 9/1989 | Zetena et al. | |
| 4,917,868 A | 4/1990 | Alexander et al. | |
| 5,055,183 A | 10/1991 | Buchan | |
| 5,089,127 A | * 2/1992 | Junker et al. | 422/264 |
| 5,253,937 A | * 10/1993 | Scheimann et al. | 137/268 |

* cited by examiner

Primary Examiner—Joseph W. Drodge
(74) Attorney, Agent, or Firm—James Ray & Associates

(57) ABSTRACT

A water treatment apparatus includes a water treatment vessel providing a water treatment zone which, in use, will contain a volume of water to be treated. A water inlet leads into the vessel, with a water outlet leading from the vessel. A cartridge holder for holding a water treatment cartridge containing a water treatment substance for treating water in the vessel, and a controller for controlling the level of water in the vessel, are also provided.

6 Claims, 10 Drawing Sheets

WATER TREATMENT VESSEL WITH CARTRIDGE HOLDER FOR HOLDING TABLETS

SUMMARY OF THE INVENTION

THIS INVENTION relates to water treatment means. It relates also to a water treatment installation, and to a water treatment cartridge.

According to a first aspect of the invention, there is provided water treatment means which comprises
- a water treatment vessel providing a water treatment zone which, in use, will contain a volume of water to be treated;
- a water inlet leading into the vessel;
- a water outlet leading from the vessel;
- cartridge holding means for holding a water treatment cartridge containing a water treatment substance for treating water in the vessel; and
- control means for controlling the level of water in the vessel.

The water treatment vessel may comprise a base or floor, a roof spaced from the base, and a wall extending peripherally between the base and the roof, with the water inlet and outlet being provided in the wall. In particular, the base and roof may be circular, with the wall thus being of annular form.

The cartridge holding means may comprise a circular opening in the vessel roof and, optionally, a collar depending from the roof around the opening. An annular recess may be provided in the upper surface of the roof around the opening to accommodate an annular flange around the cartridge, thereby to locate the cartridge in position, ie so that it protrudes a predetermined distance into the vessel.

The cartridge is then of complementary cylindrical shape so that it fits snugly in the collar, with the cartridge having a complementary radially outwardly protruding formation which engages the annular recess, thereby to locate the cartridge in position. If desired, a peripheral seal may be provided in the collar to seal off water passage between the cartridge and the collar.

Instead, the cartridge holding means may comprise at least one sleeve leading through the vessel roof, with a radially inwardly protruding locating formation, eg a lip or lug, being provided in the sleeve. The cartridge will then be of complementary cylindrical shape so that it fits snugly in the sleeve, with the cartridge having a complementary radially outwardly protruding formation which engages the formation on the sleeve, thereby to locate the cartridge in position. If desired, a peripheral seal may be provided in the sleeve to seal off water passage between the cartridge and the sleeve.

A plurality of the openings/sleeves may be provided, so that a plurality of the cartridges can be used simultaneously to treat the water in the vessel.

The water treatment means may include at least one water treatment cartridge located in the cartridge holding means. The operatively lower end of the cartridge may be open ended such that water can enter it. A plurality of inwardly directed spokes may be provided at or near the operatively lower end of the cartridge. A plurality of water treatment substance tablets, located one above the other, may be provided in the cartridge, so that a lowermost of the water treatment substance tablet rests on the spokes.

The tablets may comprise calcium hypochlorite as the water treatment substance. Instead, however, they may comprise any other suitable water treatment substance.

The invention accordingly extends also to a water treatment cartridge as hereinbefore described, for use in the water treatment means.

In one embodiment of the invention, the control means may comprise a float operated valve fitted to the water inlet, with the water inlet also being adapted so that a water supply conduit can be connected thereto, and with the float operated valve thus, in use, controlling the level of water relative to the lower end of the cartridge.

The water treatment means may then include a holder inside the vessel and located in or on the base of the vessel, for holding a smaller volume of water than that contained within the wall of the vessel, with a water withdrawal conduit leading from the holder to the water outlet so that, in use, water will be withdrawn from the vessel via the holder and the withdrawal conduit. The water withdrawal conduit may be flexible.

The holder may be located at the centre of the base and may be in the form of a hollow elongate component protruding upwardly from the base and having its upper end open, with the flexible conduit leading into the upper end of the conduit and terminating short of its closed lower end. The lower end of the component can thus, if desired, depend beyond the vessel base. The component may be circular in cross-section, ie it may be of circular cylindrical form.

The upper peripheral edge of the component is preferably spaced with vertical clearance from the lower ends of the cartridges.

The float of the float-operated valve may be of annular shape, so that it can fit over the component and with the flexible conduit leading through the central opening of the float.

In another embodiment of the invention, the control means may comprise water transfer means for transferring treated water from the inside of the vessel to the water outlet, with the water transfer means adapted to control the level of the water inside the vessel.

A nozzle may be fitted to the water inlet such that the nozzle is located inside the vessel. The nozzle may be adapted to impart swirling or rotational motion to the water in the vessel, as fresh water is introduced through the nozzle. A plurality of the water inlets, each provided with one of the nozzles, may be provided. Typically, a pair of the nozzles, spaced about 1800 apart and adapted to impart the swirling or rotational motion to the water in the vessel in the same direction, may be provided.

Each water inlet and/or outlet may be adapted such that a water conduit can be connected thereto. In one embodiment of the invention, a primary water conduit may extend through the wall of the vessel from one side of the vessel to another side so that, in use, a bulk water supply conduit can be connected to the primary conduit while a bypass or slipstream water conduit is connected to the water inlet(s) and nozzle(s).

The water transfer means may comprise a flexible water conduit having an inlet end portion and an outlet end portion, with the outlet end portion being connected to the water outlet. The inlet end portion may be attached to one end portion of a non-flexible cylindrical component, and with a water inlet being provided in the cylindrical component. The distal or free end portion of the cylindrical component may then be externally screw threaded and pass through an opening in the vessel roof, with its thread engaging complementary threads of a nut-like component located rotatably against the vessel roof. Thus, by rotating the nut-like component relative to the cylindrical component, the position or level of the water inlet of the cylindrical component can be adjusted, thereby to control or vary the level of the water in the vessel. Treated water in the vessel will thus pass, under gravity, through the water inlet in the cylindrical component, along the flexible conduit, and be discharged through the outlet. If desired, a valve may be fitted to the water outlet, on the outside of the vessel.

Thus, by varying the level of the water inlet of the cylindrical component, the depth to which the lower end of a cartridge, located in the sleeve, protrudes into water in the vessel, can be varied, thereby to vary the degree of dosage of the water with the water treatment substance. The water treatment means may include a water weep arrangement through which water can be discharged from the vessel on interruption of water entering through the water inlet nozzles, so that the lower end of the cartridge is not submerged in the water, when the water inflow ceases. The weep arrangement may include a weep tube having a water inlet end inside the vessel immediately above or at the same level as the water inlet or outlet, and a remote discharge end.

In one version of this embodiment of the invention, instead of the water inlet nozzle which is connected to the water inlet, a water conduit, fitted with a float operated valve, may be connected to the water inlet of the vessel. The conduit may be adapted to pass below the sleeve, and may be provided with a nozzle for spraying water upwardly into the sleeve.

Instead of being provided with the nut-like component, the free or distal end of the cylindrical component may be fixed to the vessel roof. A further conduit may then be located snugly yet movably within the cylindrical component, with the further conduit also having a water inlet which is smaller than the water inlet of the cylindrical component and aligned therewith. Thus, the position of the water inlet in the further conduit relative to that of the water inlet in the cylindrical component can be varied, and hence the water level in the vessel varied, by moving the further conduit up and down relative to the cylindrical component.

If desired, instead of discharging water through the water outlet, or in addition thereto, a water discharge tube may protrude into the cylindrical component, with the tube being connected, in use, to a venturi arrangement fitted to the bulk water supply. Thus, water will be drawn in through the lower end of the discharge tube and along the tube, into the venturi, due to the lower pressure created in the venturi.

According to a second aspect of the invention, there is provided water treatment means which comprises a water treatment vessel providing a water treatment zone which, in use, will contain a volume of water to be treated;

a water inlet leading into the vessel;

a water outlet leading from the vessel;

holding means for holding a cartridge containing a water treatment substance for treating water in the vessel;

a tubular component having a water inlet as its only opening inside the vessel, located in the vessel and having an upper end portion protruding through an opening in the vessel, with the extent to which the tubular component protrudes into the vessel, and hence the level or position of the water inlet therein, being adjustable; and a water discharge tube located inside the tubular component such that water to be discharged from the vessel enters the water inlet of the tubular component, then enters the lower end of the discharge tube, and passes along the discharge tube.

The discharge tube may thus, in use, be connected to a venturi or the like, for creating a reduced pressure in the discharge tube, thereby to provide the driving force for discharging treated water from the vessel.

The lower end of the tubular component may be closed off.

Instead, the tubular component may comprise a cylindrical component, as hereinbefore described, the lower end portion of which is connected to one end of a flexible conduit whose other end is connected to a water outlet of the vessel fitted with a valve, as hereinbefore described. The valve will then normally be closed.

According to a third aspect of the invention, there is provided water treatment means, which comprises a water treatment vessel providing a water treatment zone which, in use, will contain a volume of water to be treated, as well as a treated water zone located below the water treatment zone, with the zones being separated by a barrier;

a water inlet leading into the water treatment zone;

a water outlet leading from the treated water zone;

holding means for holding a cartridge containing a water treatment substance for treating water in the water treatment zone of the vessel;

a water transfer passageway in the barrier; and a cylindrical component slidably located in the passageway in the barrier, the cylindrical component having water inlet above the barrier and a water outlet below the barrier, so that the level of the water inlet, and hence the level of water in the water treatment zone, can be varied by sliding the cylindrical component up or down in the passageway.

The vessel, water inlet, water outlet and holding means may be as hereinbefore described.

The water transfer passageway may comprise an opening in the barrier, and a sleeve around the opening, with the cylindrical component fitting snugly yet slidably in the sleeve.

The cylindrical component thus has an upper end, a lower end, and a peripheral wall extending from the upper end to the lower end. The wall may be of any desired cross-sectional shape, eg square, rectangular, or the like, but will normally be circular. The water inlet may be provided in the wall, while the component may be open at its lower end, with the open lower end thus constituting the water outlet.

According to a fourth aspect of the invention, there is provided water treatment means, which comprises a water treatment vessel providing a water treatment zone which, in use, will contain a volume of water to be treated, as well as a treated water zone located below the water treatment zone, with the zones being separated by a barrier;

a water inlet leading into the water treatment zone;

a water outlet leading from the treated water zone;

holding means for holding a cartridge containing a water treatment substance for treating water in the water treatment zone of the vessel;

a water transfer passageway or opening in the barrier;

a cylindrical component slidably located in the passageway or opening in the barrier, the cylindrical component having water inlet above the barrier and a water outlet below the barrier, so that the level of the water inlet, and hence the level of water in the water treatment zone, can be varied by sliding the cylindrical component up or down in the passageway or opening; and a pump having an inlet and an outlet, with the pump inlet being operatively connected to the water outlet of the treated water zone.

The water treatment vessel may be as hereinbefore described, and may be provided with nozzles as hereinbefore described.

A water transfer passageway may be provided in the barrier, and may comprise an opening in the barrier, and a sleeve around the opening and attached to the barrier, with the cylindrical component fitting snugly yet slidably in the sleeve.

The cylindrical component thus has an upper end, a lower end, and a peripheral wall extending from the upper end to the lower end. The wall may be of any desired cross-sectional shape, eg square, rectangular, or the like, but will normally be circular. The water inlet may be provided in the wall, while the component may be open at its lower end, with the open lower end thus constituting its water outlet.

The pump may, in particular, be a centrifugal pump driven by drive means such as an electrical motor. The pump inlet will thus typically be connected to the water outlet by means of a conduit.

The water treatment means may include a water inlet in the vessel in the treated water zone, with the pump outlet or discharge being operatively connected to this water inlet, eg by means of a conduit; a float operated valve inside the treated water zone and fitted to this water inlet and/or to the conduit leading from the pump discharge to the water inlet; and discharge conduit leading from a discharge port of the valve out of the vessel. Thus, on the water level in the treated water zone dropping, the valve will close progressively under the action of the float, while the valve will open progressively as the water level in the treated water zone rises.

Thus, by varying the level of the water inlet of the cylindrical component, the depth to which the lower end of a cartridge, located in the cartridge sleeve, protrudes into water in the vessel, can be varied, thereby to vary the degree of dosage of the water with the water treatment substance. The water treatment means may include a water weep arrangement through which water can be discharged from the vessel on interruption of water entering through the water inlet nozzles, so that the lower end of the cartridge is not submerged in the water, when the water inflow ceases. The weep arrangement may include a weep tube having a water inlet end inside the water treatment zone, and a remote discharge end in the treated water zone.

In one embodiment of this aspect of the invention, instead of the water inlet nozzle connected to the water inlet, a water conduit, fitted with a float operated valve, may be connected to the water inlet of the vessel. The conduit may be adapted to pass below the sleeve, and may be provided with a nozzle for spraying water upwardly into the sleeve.

According to a fifth aspect of the invention, there is provided a water treatment installation, which comprises
 a pump, with a water feed conduit connected to the pump inlet and a water discharge conduit connected to the pump outlet;
 water treatment means as hereinbefore described, with a water supply conduit leading from the water discharge conduit of the pump to the vessel water inlet, and a treated water conduit leading from the vessel water outlet to the water feed conduit to the pump.

The vessel may be located a higher level than the pump, or at least at a higher level than the point at which the treated water conduit is connected to the water supply conduit so that, when the pump is not in operation, water in the vessel will siphon through the flexible conduit until the bulk water in the vessel reaches the level of the upper peripheral edge of the component, which thus functions as a weir. This will ensure that the lower ends of the cartridges are clear of the water in the vessel, when the pump is not in operation.

According to a sixth aspect of the invention, there is provided a water treatment installation, which comprises
 water treatment means as hereinbefore described; and
 a water conduit connected to the water inlet of the vessel.

While the water conduit may be a main or bulk water supply conduit, it will normally be a branch or secondary water supply conduit leading from a bulk water supply conduit. The bulk water supply conduit may then be connected to the primary conduit leading through the vessel or to a bulk water supply conduit passing around, ie bypassing, the vessel.

The bulk water supply conduit will thus lead from a bulk water supply requiring treatment, eg sewage water or other water requiring chlorination. The bulk water supply conduit may be such that water flows under gravity from the bulk supply. However, it is envisaged that the bulk water supply conduit will normally be fitted with a pump. The branch conduit may then lead from the bulk conduit downstream of the pump.

The vessel outlet may, if desired, be connected by means of a discharge branch conduit to the bulk conduit. However, if desired, the discharge conduit may tie into the bulk water supply conduit upstream of the pump. Still further, a venturi arrangement comprising a venturi may be fitted to the bulk conduit downstream of the pump and downstream of the branch water supply conduit connected to the vessel inlet(s), with the water discharge tube of the water treatment means connected to the venturi.

According to a seventh aspect of the invention, there is provided a water treatment cartridge for use in water treatment means as hereinbefore described, the cartridge comprising a hollow elongate holder having at least one of its ends open and adapted to be held by or in the cartridge holding means of the water treatment means, and a water treatment substance inside the holder.

The holder may be of elongate cylindrical form, and may be, at or near its open end, a plurality of inwardly directed spokes. The water treatment means substance may be in the form of tablets located one adjacent the other in the holder with one tablet abutting the spokes. An annular flange may be provided around the holder, with the flange, in use, fitting into a complementary recess in the water treatment means so that the cartridge is thereby held by the cartridge holding means of the water treatment means.

The invention will now be described by way of example with reference to the accompanying diagrammatic drawings.

DETAILED DESCRIPTION OF THE INVENTION

Figure 1:
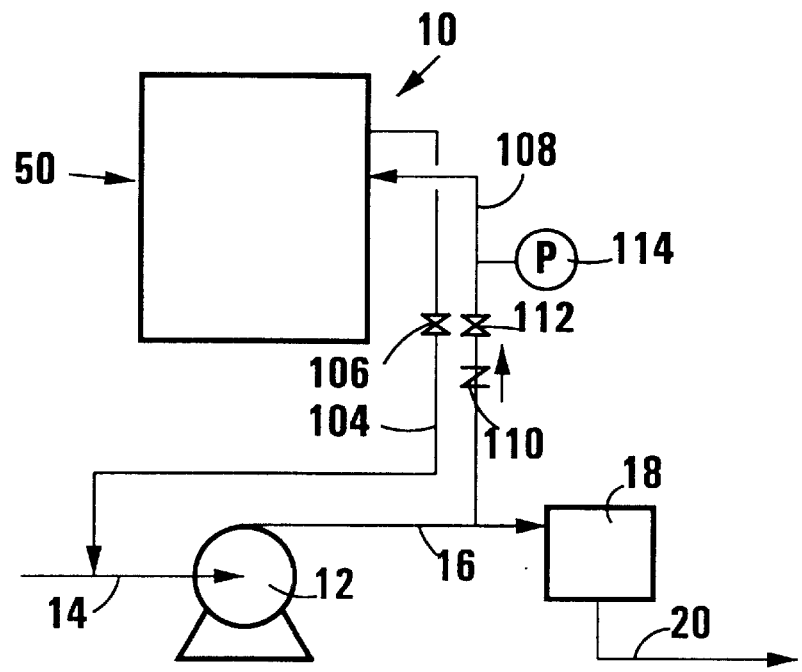
FIG. 1 shows, in simplified flow diagram form, a water treatment installation according to a first embodiment of the invention and incorporating water treatment means according to the invention.
Figure 2:
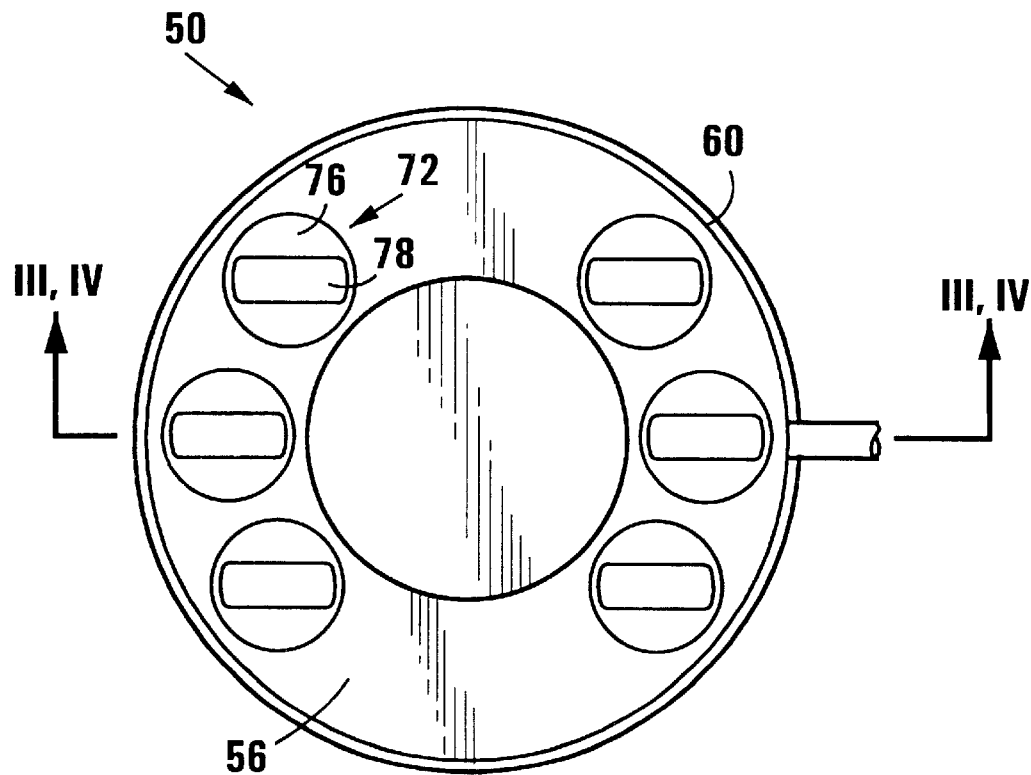
FIG. 2 shows a plan view of the water treatment means shown in FIG. 1.

Referring to FIGS. 1 to 4, reference numeral 10 generally indicates a water treatment installation according to a first embodiment of the invention.

The water treatment installation 10 includes a centrifugal pump 12 with a water supply conduit 14 connected to the pump inlet. A water discharge conduit 16 is connected to the pump outlet, and leads into a filter 18. A treated water discharge conduit 20 leads from the filter 18.

The water treatment installation 10 also includes water treatment means, generally indicated by reference numeral 50. The water treatment means 50 includes a water treatment vessel, generally indicated by reference numeral 52. The vessel 52 includes a circular base 54, a circular roof 56 spaced from the base 54, and a peripheral wall 58 connecting the base 54 to the roof 56.

The vessel 52 is located on a further upwardly open flat-bottomed vessel 60 which thus constitutes a stand for the vessel 52. A drainage conduit 62 leads from the vessel 60, and is fitted with a valve 64.

In the roof 56 of the vessel 52 are provided a plurality of cartridge openings 66. The cartridge openings 66 are thus staggered from one another, as indicated most clearly in FIG. 2. A collar 68 is provided around each of the openings 66 and depends downwardly from the roof 56. An annular recess 70 is provided in the upper surface of the roof 56 around each of the openings 66.

In each of the openings 66 is located a water treatment substance cartridge, generally indicated by reference numeral 72. Each cartridge 72 comprises a cylindrical container 74, the operatively upper end 76 of which is closed off and provided with a handle 78. The operatively lower ends 80 of the cartridges 72 are open. In proximity to the lower end 80 of each of the cartridges 72 are provided a plurality of radially inwardly protruding spokes (not shown). The spokes slant inwardly upwardly, and are mounted to an annular ring (not shown) which is located in a circumferential recess (not shown) in the container. Towards its upper end 76, each of the cartridges 72 is provided with an annular flange 82 which is accommodated in the recess 70 in the vessel roof 56, thereby locating the cartridges relative to the vessel 52. Thus, the lower ends 80 of the cartridges are located a predetermined distance from the base 54 of the vessel when their flanges 82 rest in the recesses 70. A plurality of calcium hypochlorite tablets are provided inside each of the containers 74.

The water treatment means 50 also includes a cylindrical component 84 protruding upwardly from the centre of the base 54. A cylindrical extension 86 fits snugly within the component 84 and has its lower end 88 closed off.

A water outlet 90 is provided in the vessel wall 58, and a flexible conduit 92 leads from the outlet 90 into the component 86, with its lower end 94 terminating with clearance from the lower end 88 of the component 86.

A float operated valve 94 is fitted to a water inlet, generally indicated by reference numeral 96, in the vessel wall 58. The valve 94 is connected, by means of an arm 98, to an annular float 100. The annular float 100 thus has a central opening 102 which is sized such that it can fit over the component 84. The conduit 92 thus leads through the opening 102.

A conduit 104, fitted with a valve 106, leads from the water outlet 90 to the water supply conduit 14 to the pump 12. A conduit 108 leads from the water discharge conduit 16 to the vessel inlet 96. The conduit 108 is fitted with a non-return valve 110, a shut-off valve 112 and a pressure gauge 114.

Typically, the conduit 108 can have a nominal diameter of about 80 mm, while the conduit 104 can have a nominal diameter of about 12 mm.

The vessel 52 is located at a higher level than the pump 12.

In use, water to be treated with chlorine is pumped, by means of the pump 12, along the conduit 16. A slipstream of this water passes along the conduit 108, into the vessel 52, through the float operated valve 94. Treated water is withdrawn, under the suction created in the conduit 14 by the pump 12, along the flexible conduit 92 and the conduit 104.

Figure 3:
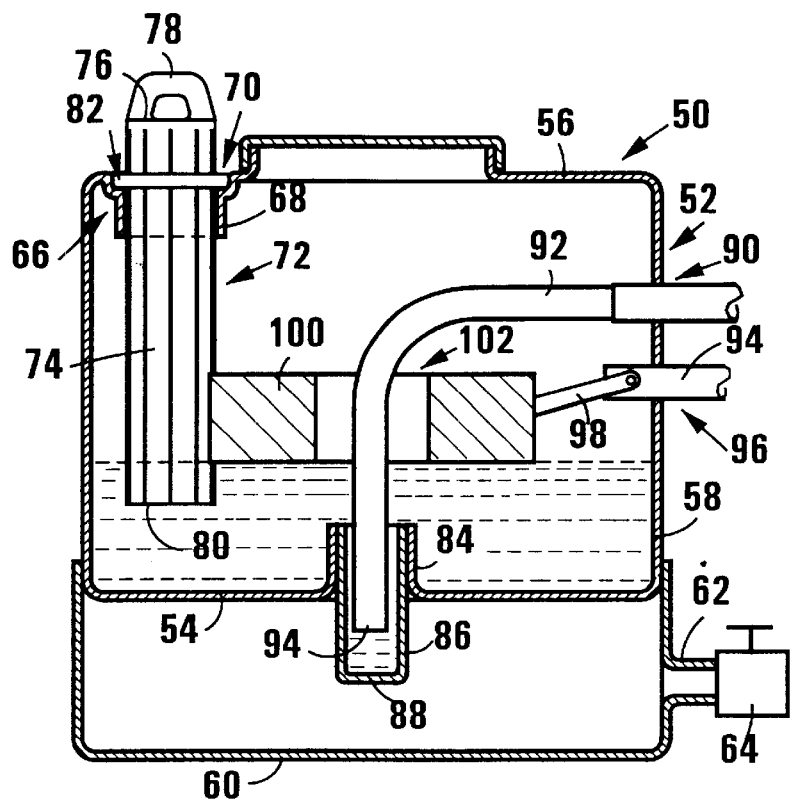
FIG. 3 shows a vertical sectional view through III—III in FIG. 2, of the water treatment means of FIG. 2, with some details omitted for clarity.

Water flowing into the vessel 52 will normally always exceed water flowing from it, but overflow cannot occur since the float 100 will close off the valve 94 before this can happen. The water level will thus reach an equilibrium, during normal operation, within the vessel 52, typically as indicated in FIG. 3. Thus, if the float drops due to an increased outflow, the water flowing into the vessel will increase, and vice versa.

In the event that the pump 12 is switched off, water will thus no longer enter the vessel 52 through the valve 94.

Figure 4:
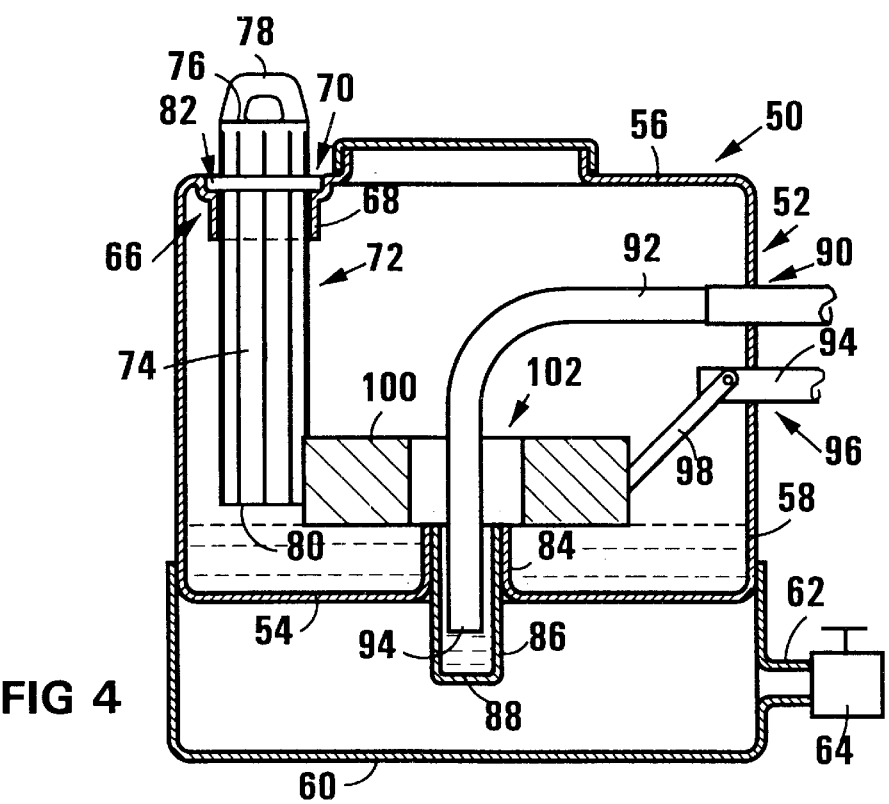
FIG. 4 shows a vertical sectional view similar to FIG. 3, with the float of the water treatment means in a different position.

However, since the vessel 52 is located at a higher level than the pump 12, and in particular at a higher level than the point at which the conduit 104 enters the conduit 14, water will continue to siphon through the flexible conduit 92 and the conduit 104 into the conduit 14. The upper peripheral edge of the component 84 will thus function as a weir and this siphoning will only cease once the level of the water inside the vessel 52 reaches the level of the upper edge of the component 84, as indicated in FIG. 4. Siphoning will then continue for a short while until the water inside the component 86 reaches the level of the lower end 94 of the conduit 92. The siphoning effect is then broken due to air suction. However, on restarting the pump 12, suction is reestablished within a very short period of time, ie a short enough time interval so that the pump 12 will not suck air via the conduits 104, 92, due to water from the bulk water supply in the vessel 92 then again entering the components 84, 86.

The non-return valve 110 on the water feed conduit 108 ensures that there is always water remaining in the conduit 108 to rapidly replenish water in the vessel, for the centrifugal pump 12 to retain its prime on restarting.

The float 100 has relatively large dimensions which, coupled with the relatively short arm 98, ensures sufficient leverage for accurate control of the level of the water in the vessel 52 during normal operation. If desired, adjustment means (not shown) for adjusting the level at which the arm 98 is attached to the float 100, and hence the level of the water inside the vessel 52, can be provided.

The component 84 thus ensures that, when the water treatment means 50 is not in operation, the cartridges 72 are not submerged in water. This will ensure that the calcium hypochlorite tablets remain dry, thereby avoiding wastage as well as enhancing non-clogging through chemical residues of components of the water treatment means 50.

Figure 5:
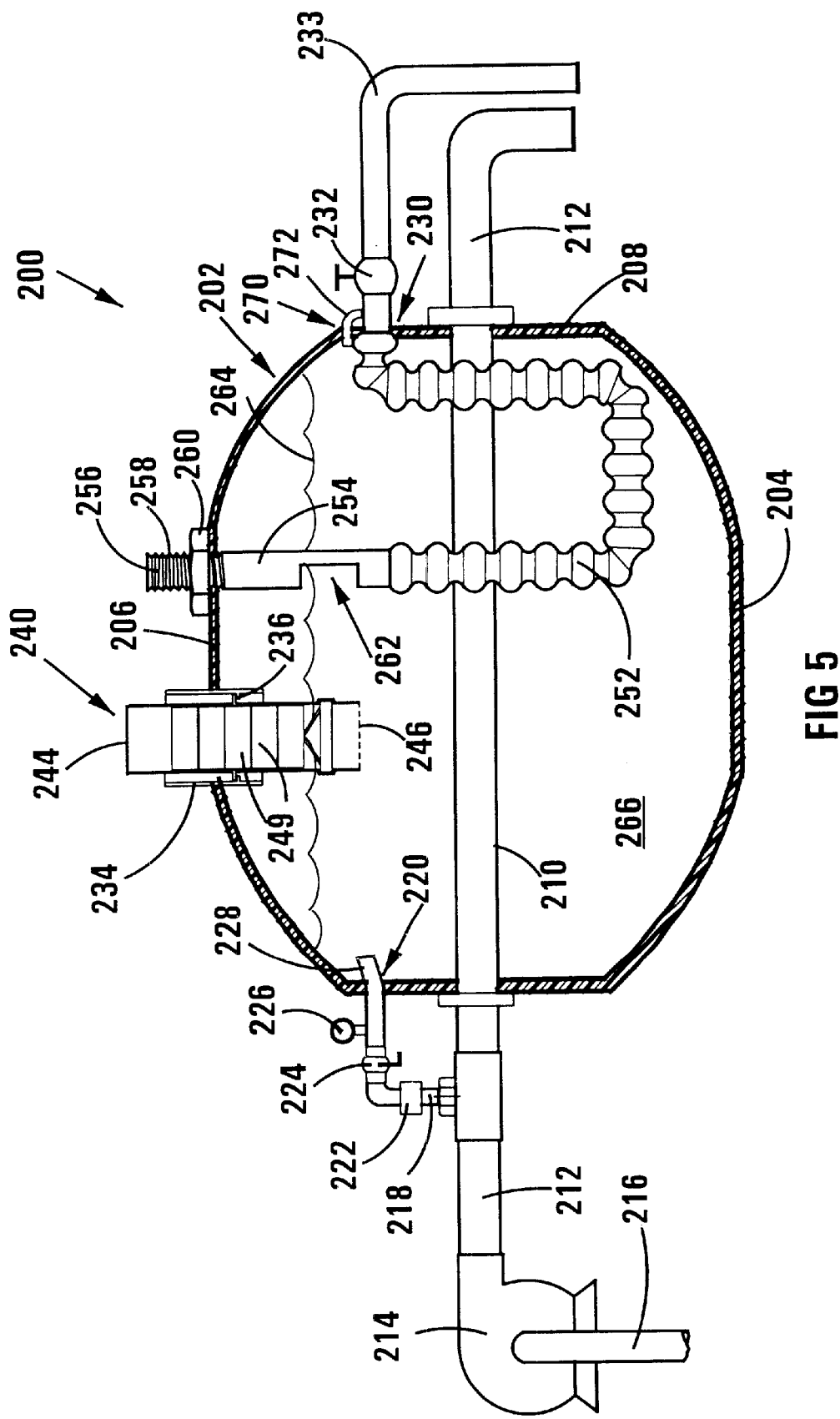
FIG. 5 shows a longitudinal sectional view of a water treatment installation according to a second embodiment of the invention.
Figure 6:
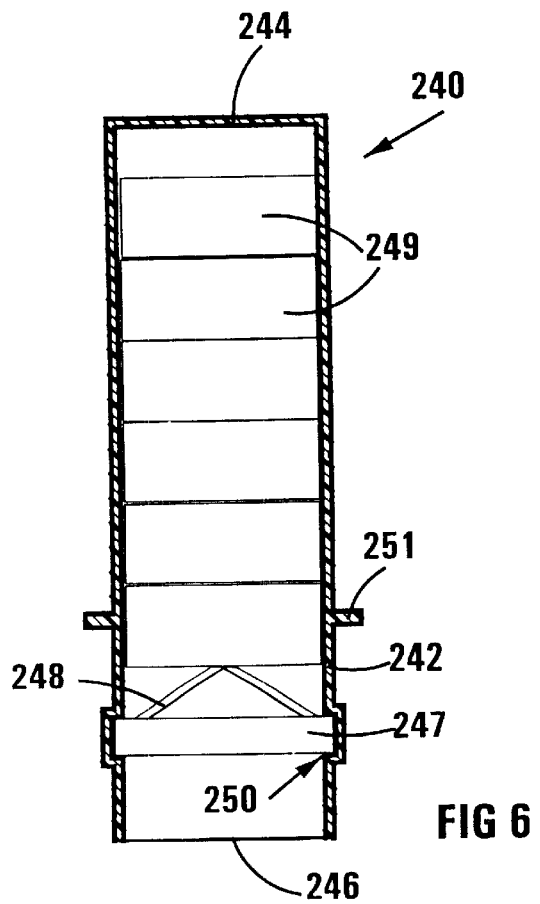
FIG. 6 shows a enlarged view of the water treatment substance cartridge of FIG. 5.

Referring to FIGS. 5 and 6, reference numeral 200 generally indicates a water treatment installation according to a second embodiment of the invention.

The installation 200 includes a water treatment vessel, generally indicated by reference numeral 202. The vessel 202 includes a circular base 204, and a circular roof 206 spaced from the base 204. A peripheral wall 208 connects the base 204 to the roof 206.

A bulk water conduit 210 extends diametrically through the vessel 202, and is connected to a bulk water supply conduit 212 leading from the discharge of a pump 214. The pump suction is connection to a conduit 216 which leads from a supply of water to be chlorinated.

A branch water conduit 218 leads from the bulk conduit 212 to an inlet 220 in the wall 208 of the vessel 202. The conduit 218 is fitted with a solenoid valve 222, which is operatively connected to the pump motor (not shown) so that the solenoid valve only opens when the pump 214 runs. The conduit 208 is also fitted with a valve 224 for regulating the flow of water through the conduit 218, as well as a pressure gauge 226. To the water inlet 220 is fitted, on the inside of the vessel 202, a nozzle 228. The nozzle 228 is arranged at an angle such that water entering the vessel 228 through it causes swirling or rotation, eg in a clockwise direction, of water inside the vessel 202.

A water outlet 230 is also provided in the vessel wall 208, and a valve 232 is connected thereto. A conduit 233 leads from the valve 232.

A sleeve 234 extends through the vessel roof 206, and is provided with a radially inwardly protruding peripheral lip 236. A water treatment substance cartridge, generally indicated by reference numeral 240, is located inside the sleeve 234. The cartridge 240 comprises a cylindrical holder or container 242 the operatively upper end 244 of which is closed off. The operatively lower end 246 of the cartridge 240 is open. In proximity to the lower end 246 of the cartridge 240 are provided a plurality of radially inwardly protruding spokes 248. The spokes 248 slant inwardly upwardly, and are mounted to an annular ring 247 which is located in a circumferential recess 250 in the container 242. A locating formation 251 extends peripherally and radially outwardly from the container 242 and rests on the lip 236, thereby locating the cartridge 240 in position. A plurality of calcium hypochlorite tablets 249 are provided inside the container 242.

The installation 200 also includes a flexible conduit 252, the one end of which is attached to the vessel water outlet 230. The other end of the flexible conduit 252 is attached to the operatively lower end of a cylindrical component 254. The operatively upper end portion 256 of the cylindrical component 254 protrudes through an opening in the vessel roof 206 and is provided with an external screw thread formation 258. The screw thread formation 258 engages the complementary threads of a nut-like component 260. A water inlet opening, generally indicated by reference numeral 262 is provided in the cylindrical component 254. Thus, by rotating the nut-like component 260 relative to the cylindrical component 254, the depth to which the cylindrical component 254 protrudes into the vessel 202, and hence the level of the water inlet opening 262, can be varied. In use, the water level 264 will, however, always be such that the lower end of the cartridge 240 protrudes into water 266 in the vessel 202.

The water treatment installation 200 also includes a weep arrangement, generally indicated by reference numeral 270. The weep arrangement 270 comprises a tube 272 whose inlet is located inside the vessel 202, and whose outlet is located in the valve 232. The inlet of the tube 272 is located at such a level that, when the vessel 202 is not in operation, the water therein will drain through the weep tube 272 until the level 264 thereof is located below the lower end 246 of the cartridge 240, thereby ensuring that the tablets 249 are not located in water when the vessel 202 is not in operation.

In use, water to be treated is pumped along the bulk water supply conduit 212, 210, while a slipstream of water is withdrawn through the branch conduit 218 into the vessel 202. Since the lower end of the cartridge 240 protrudes into the water 266 in the vessel, the water is dosed with chlorine as the calcium hypochlorite tablets 249 in the cartridge 240 dissolve. Treated water flows through the water inlet 262 of the cylindrical component 254, along the flexible conduit 252 and is discharged through the valve 232 and conduit 233 into the bulk supply of water which is discharged through the bulk conduit 212.

The dosage rate of the water 266 is controlled primarily by varying the level of the water inlet 262 of the cylindrical component 254. However, it is also influenced by the degree of turbulence obtained by means of the nozzle 228, the size and design of the nozzle 228, the angle at which the nozzle is located, the flow rate through the branch conduit 218 which is adjusted by means of the valve 224, and the flow rate from the vessel 242 through the valve 232. The water flow rate along the primary water conduit 210 can also be used to control the dosage rate.

If desired, more than one water inlet nozzle 228 can be provided. Typically, two such nozzles, located diametrically apart, may be provided.

Figure 7:
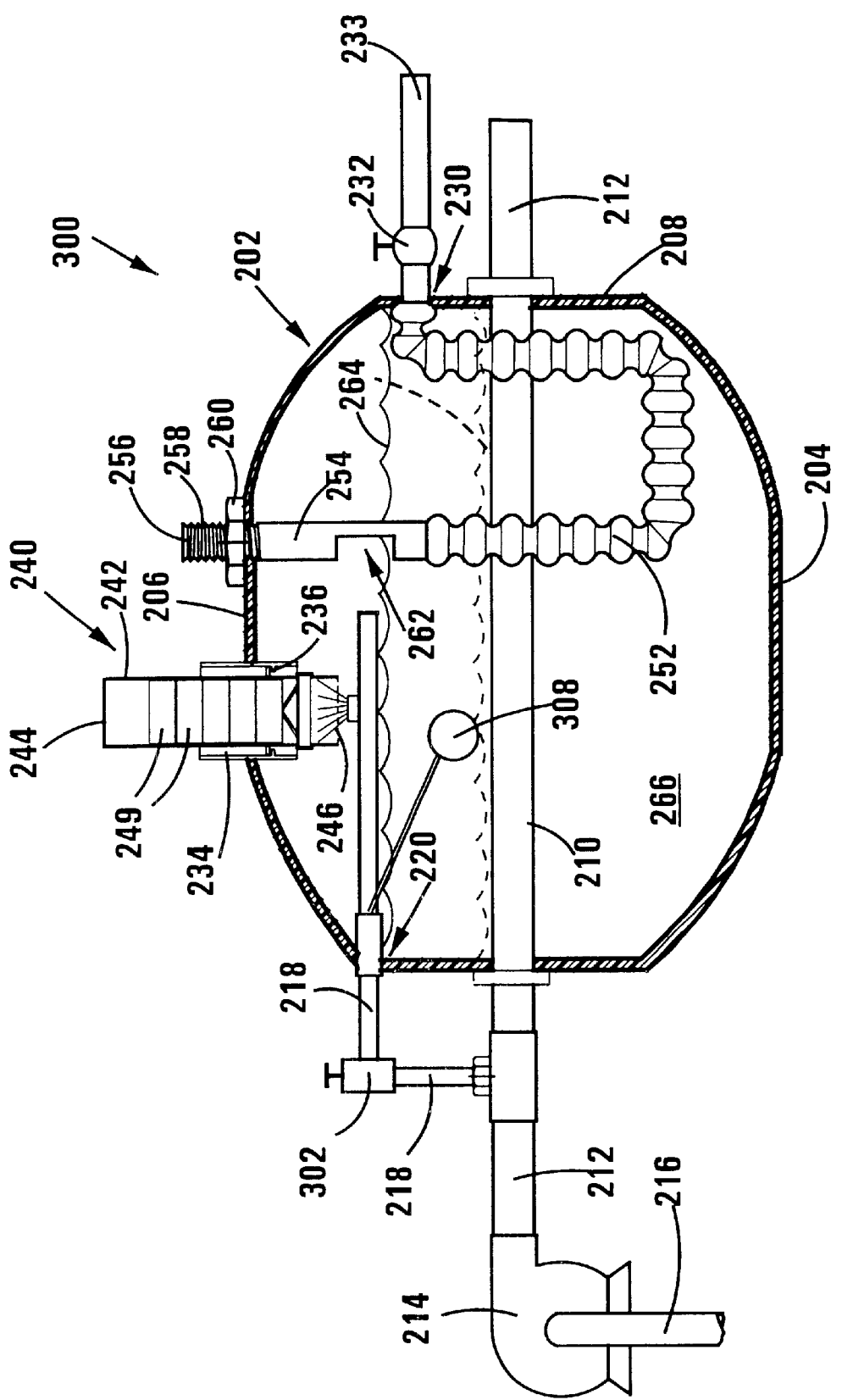
FIG. 7 shows a longitudinal cross-sectional view of a water treatment installation according to a third embodiment of the invention.

Referring to FIG. 7, reference numeral 300 generally indicates a water treatment installation according to a third embodiment of the invention.

Parts of the water treatment installation 300 which are the same or similar to those of the water treatment installation 200 hereinbefore described with reference to FIGS. 5 and 6, are indicated with the same reference numerals.

In the installation 300, the nozzle 228 is dispensed with. Instead, the branch conduit 218 is provided with a pressure regulator 302, with the branch conduit 218 leading from the pressure regulator 302 into the vessel 202, and with the conduit 218 extending below the cartridge 240. Underneath the cartridge 240 the conduit 218 is provided with a nozzle 304 for spraying water upwardly against the lower end of the cartridge 240, thereby to dissolve the tablets 249, with the treated water then falling downwardly into the volume of water 266 contained in the vessel 202. The conduit 218 is also provided with a valve 306 operated by means of a float 308. Thus, when the level 262 of the water 266 in the vessel 202 is at a low level, as indicated in broken line in FIG. 7, the float 308 will drop, thus opening the valve 306 and resulting in water entering the vessel. However, when the vessel is full of water, eg as is the case when it is not in operation, which can typically be controlled by the valve 232, the water level 264 will be at a high level so that the float 308 will urge the valve 306 into a closed position.

Figure 8:
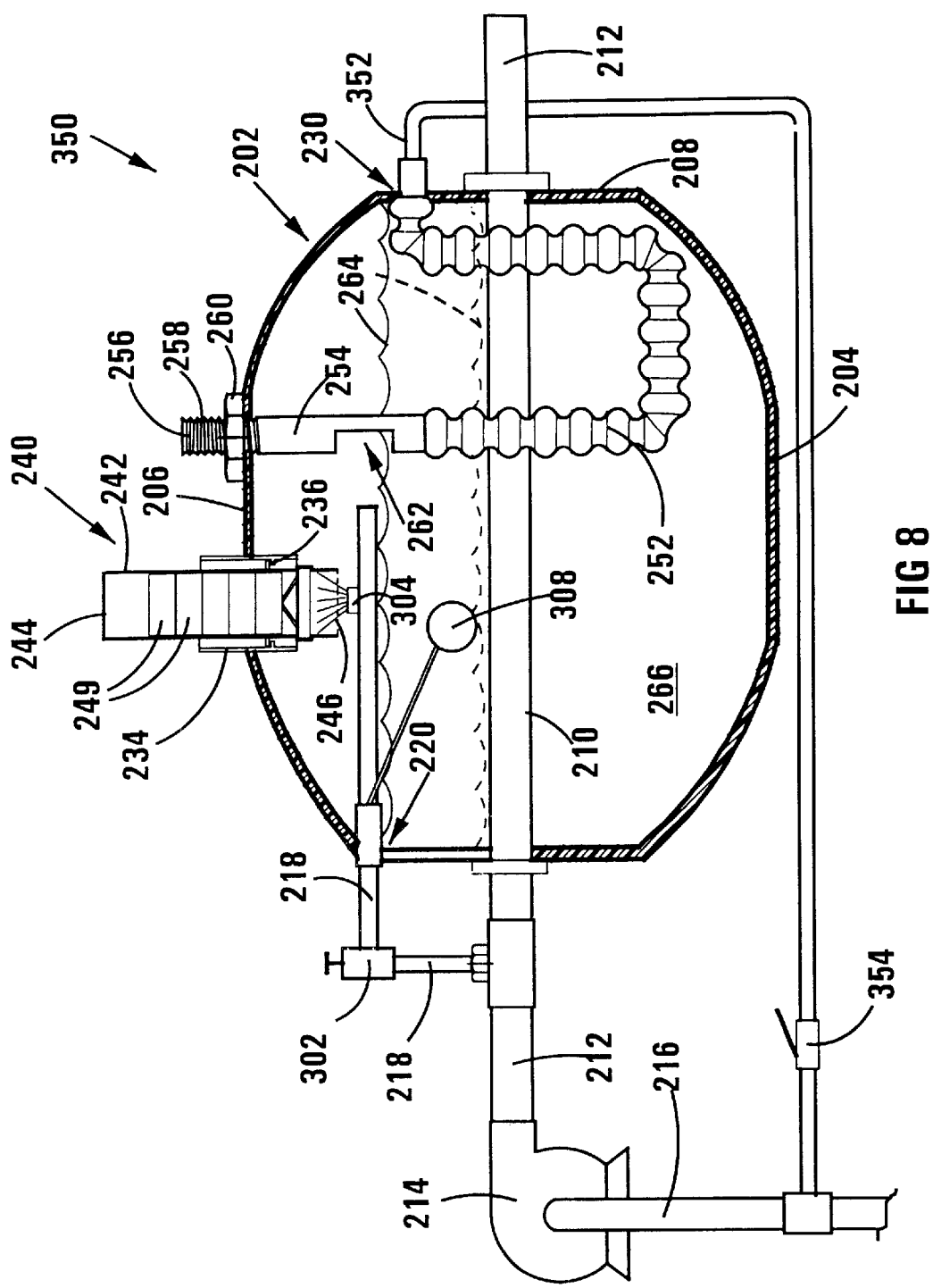
FIG. 8 shows a cross-sectional view of a water treatment installation according to a fourth embodiment of the invention.

Referring to FIG. 8, reference numeral 350 generally indicates a water treatment installation according to a fourth embodiment of the invention.

Parts of the water installation 350 which are the same or similar to those of the water treatment installation 300 hereinbefore described with reference to FIG. 7, are indicated with the same reference numerals.

In the case of the installation 350, the valve 232 which is mounted to the water outlet 230 of the vessel 202 is dispensed with. Instead, a discharge conduit 352 leads from the outlet 230 back to the suction conduit 216 to the pump 214. The conduit 352 is fitted with a valve 354 for controlling the flow rate of the water along the conduit 352 and hence the rate of dosage thereof.

Figure 9:
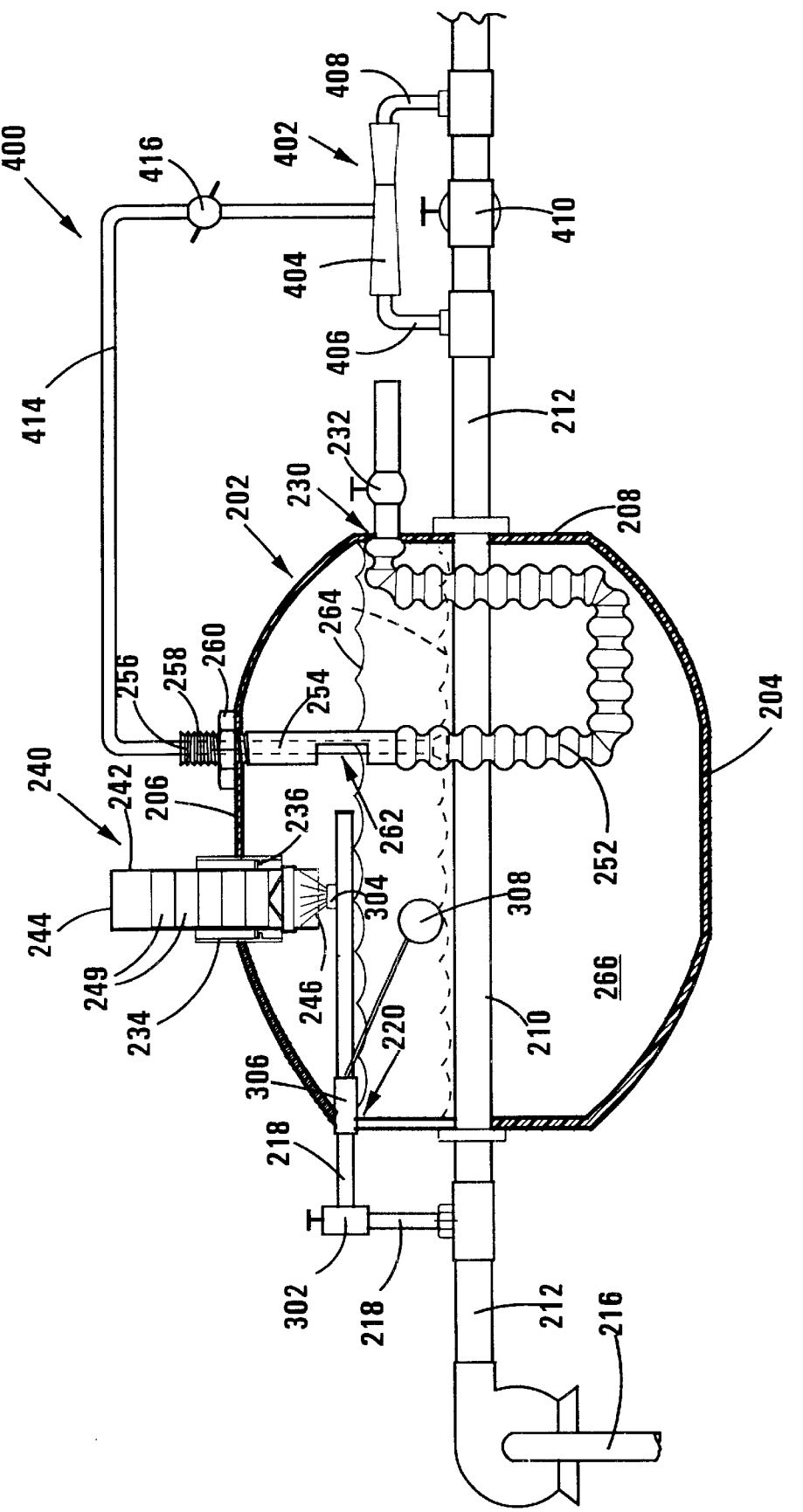
FIG. 9 shows a cross-sectional view of a water treatment installation according to a fifth embodiment of the invention.

Referring to FIG. 9, reference numeral 400 generally indicates a water treatment installation according to a fifth embodiment of the invention.

Parts of the water treatment installation 400 which are the same or similar to those of the water installations 200, 300 and 350 hereinbefore described, are indicated with the same reference numerals.

In the water treatment installation 400, a venturi arrangement 402 is fitted to the conduit 212. The venturi arrangement 402 comprises a venturi 404 operatively connected to the conduit 212 by means of branch conduits 406, 408. A pressure regulating valve 410 is provided in the conduit 212 between the branches 406, 408.

A water discharge tube 412 is located inside the cylindrical component 254, such that its lower end is located within the flexible conduit 252. The discharge tube 412 is connected to the venturi by means of a conduit 414 fitted with a valve 416.

In use, in the installation 400, water will enter the water inlet 262 of the cylindrical component 254 as hereinbefore described. However, the valve 232 will be closed so that the water will then be discharged by entering the lower end of the water discharge tube 412, under the reduced pressure in the discharge tube 412 and the conduit 414 as a result of the venturi 404, thereby to enter the conduit 212 along the branch conduit 408.

Figure 10:
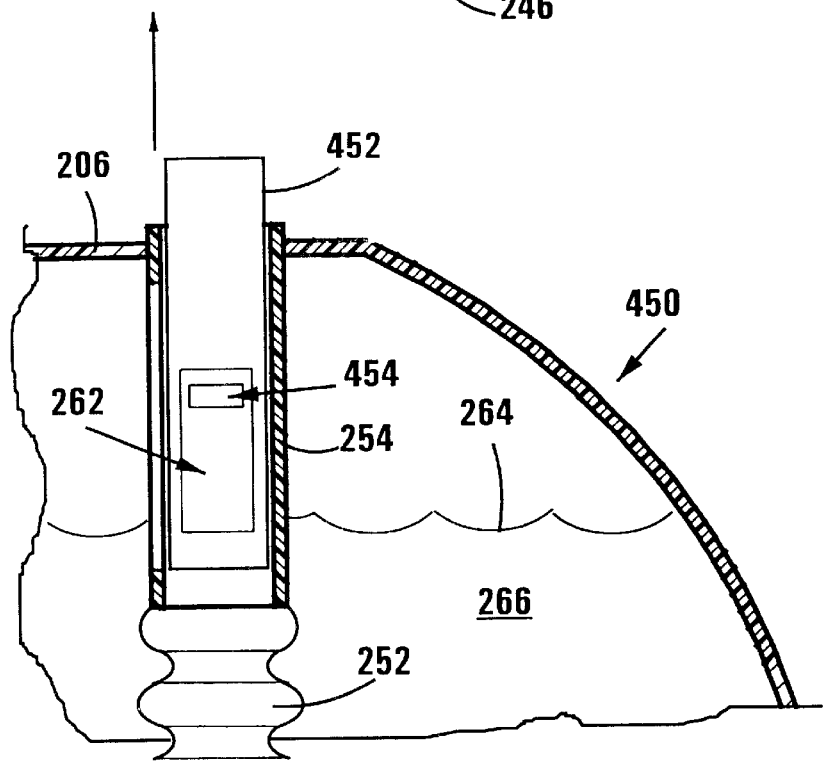
FIG. 10 shows a cross-sectional view of a water treatment installation according to a sixth embodiment of the invention.

Referring to FIG. 10, reference numeral 450 generally indicates part of a water treatment installation according to a sixth embodiment of the invention.

Parts of the water treatment installation 450 which are the same or similar to those of any of the water treatment installations 200, 300, 350 and 400 are indicated with the same reference numerals.

In the water treatment installation 450, the upper end of the cylindrical component 254 is not threaded. Instead, it is fixed to the vessel roof 206. A tubular component 452 fits snugly within the cylindrical component 254 and is provided with a smaller water inlet 454. By sliding the tubular component 452 up and down relative to the cylindrical component 254, the position of the water inlet 454, and hence the level 264 of the water 266, can be varied.

Figure 11:
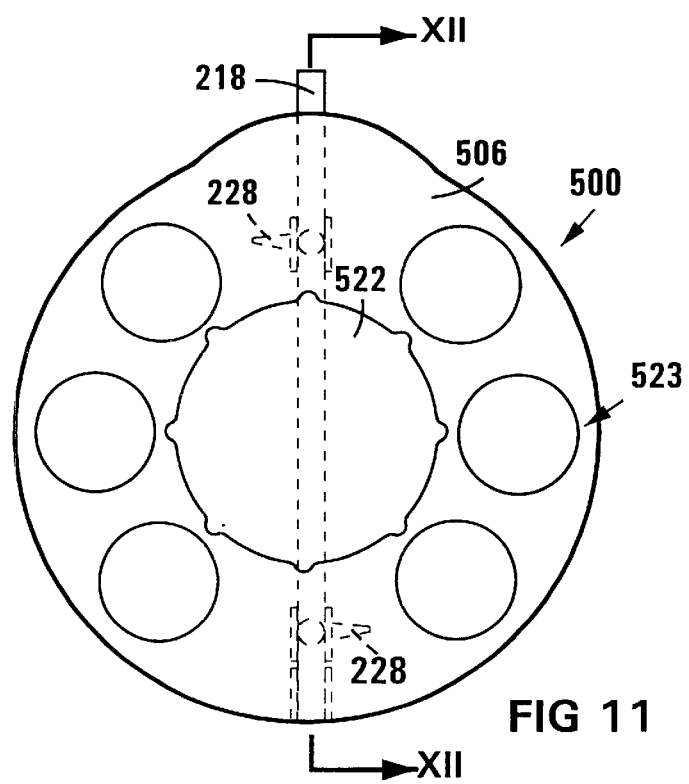
FIG. 11 shows a plan view of water treatment means for use in a water treatment installation according to a seventh embodiment of the invention.
Figure 12:
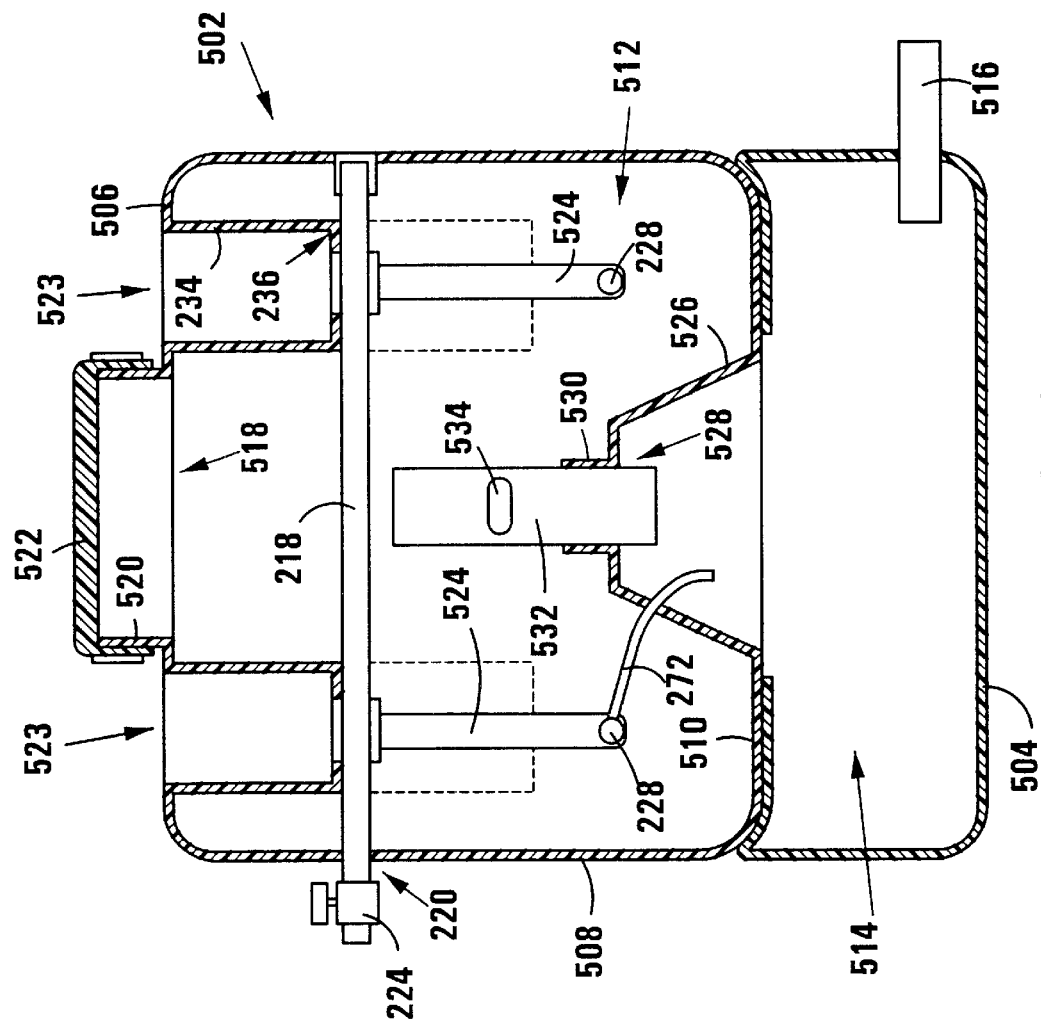
FIG. 12 shows a cross-sectional view through XII—XII in FIG. 11.

Referring to FIGS. 11 and 12, reference numeral 300 generally indicates water treatment means for use in a water treatment installation according to a seventh embodiment of the invention.

The installation 500 comprises a water treatment vessel, generally indicated by reference numeral 502. The water treatment vessel 502 comprises a circular base 504 and a circular roof 506 spaced from the base 504. A peripheral wall 508 connects the base 504 to the roof 506. A barrier 510 separates the inside of the vessel into an upper water treatment zone 512 as well as a lower treated water zone 514. An outlet tube 516 leads through the vessel wall 508, from the treated water zone 514.

The roof 506 is provided with a central opening 518 defined by an upwardly protruding collar 520 having an external screw thread. A lid or cap 522, having a complementary internal screw thread, closes off the opening 508.

Six cartridge openings 523 are provided in the roof 506, and around each of the openings 523 depends downwardly a sleeve 44 as hereinbefore described, and provided with radially inwardly protruding peripheral lips 236. Each of the sleeves 234 can thus accommodate one of the water treatment substance cartridges 240 (not shown in FIGS. 11 and 12).

The wall 508, within the water treatment zone 512, is provided with the water inlet 220, through which leads the branch water conduit 218, as hereinbefore described. The branch conduit 218 extends diametrically across the vessel 502, and is provided with two downpipes 524 to the lower ends of which are fitted the nozzles 228. A weep tube 272 is attached to the lower end of one of the downpipes 524 into the treated water zone 514 to ensure that, when the apparatus is not in use, water in the water treatment zone 512 will drop from the normal level 264 to a lower level so as to be clear of the lower ends of cartridges 240 located in the sleeves 234.

The barrier 510 includes a raised central portion 526 in which is located a central opening 528. The barrier 510 also comprises a sleeve 530 protruding upwardly around the opening 528. A cylindrical component 532 is slidably located within the sleeve 530. The cylindrical component 532 thus comprises a cylindrical wall having an open upper end and an open lower end. A water inlet 534 is provided in the wall. Thus, by sliding the cylindrical component 532 up and down within the sleeve 530, the water level 264 can be controlled at a desired height within the water treatment zone 512 since water passes through the outlet 534 and through the lower end of the cylindrical component 532, into the treated water zone 514.

The water treatment means 500 otherwise functions in substantially identical fashion to the water treatment installation as hereinbefore described with reference to FIG. 5.

The number of cartridges 240 used in the water treatment means 500 can be used to control the water dosage level. Thus, for example, by using two cartridges rather than one cartridge, a doubling of the dosage level can be achieved.

Figure 13:
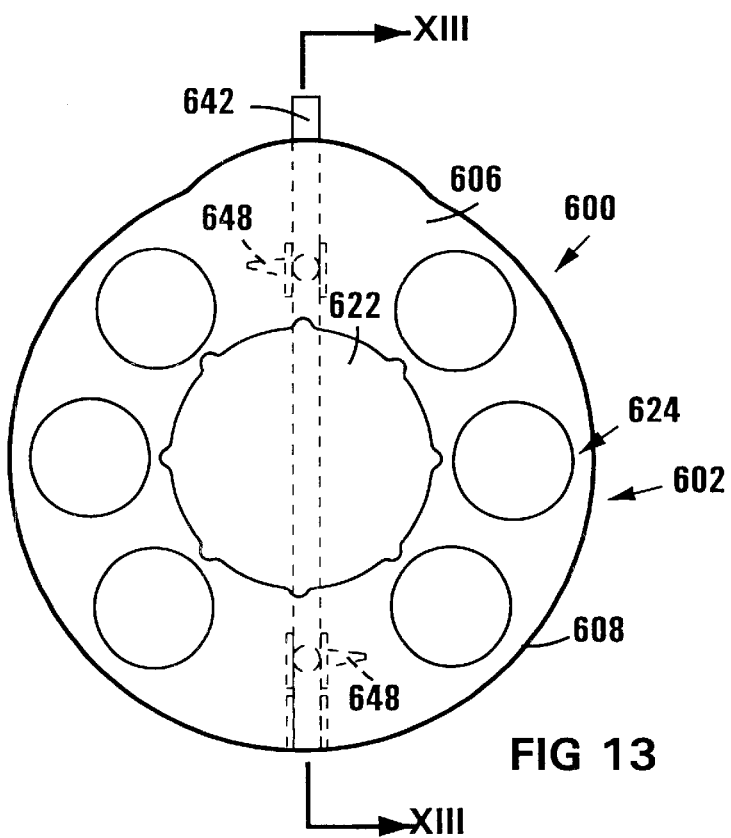
FIG. 13 shows, in part, a plan view of water treatment means for use in a water treatment installation according to an eighth embodiment of the invention.
Figure 14:
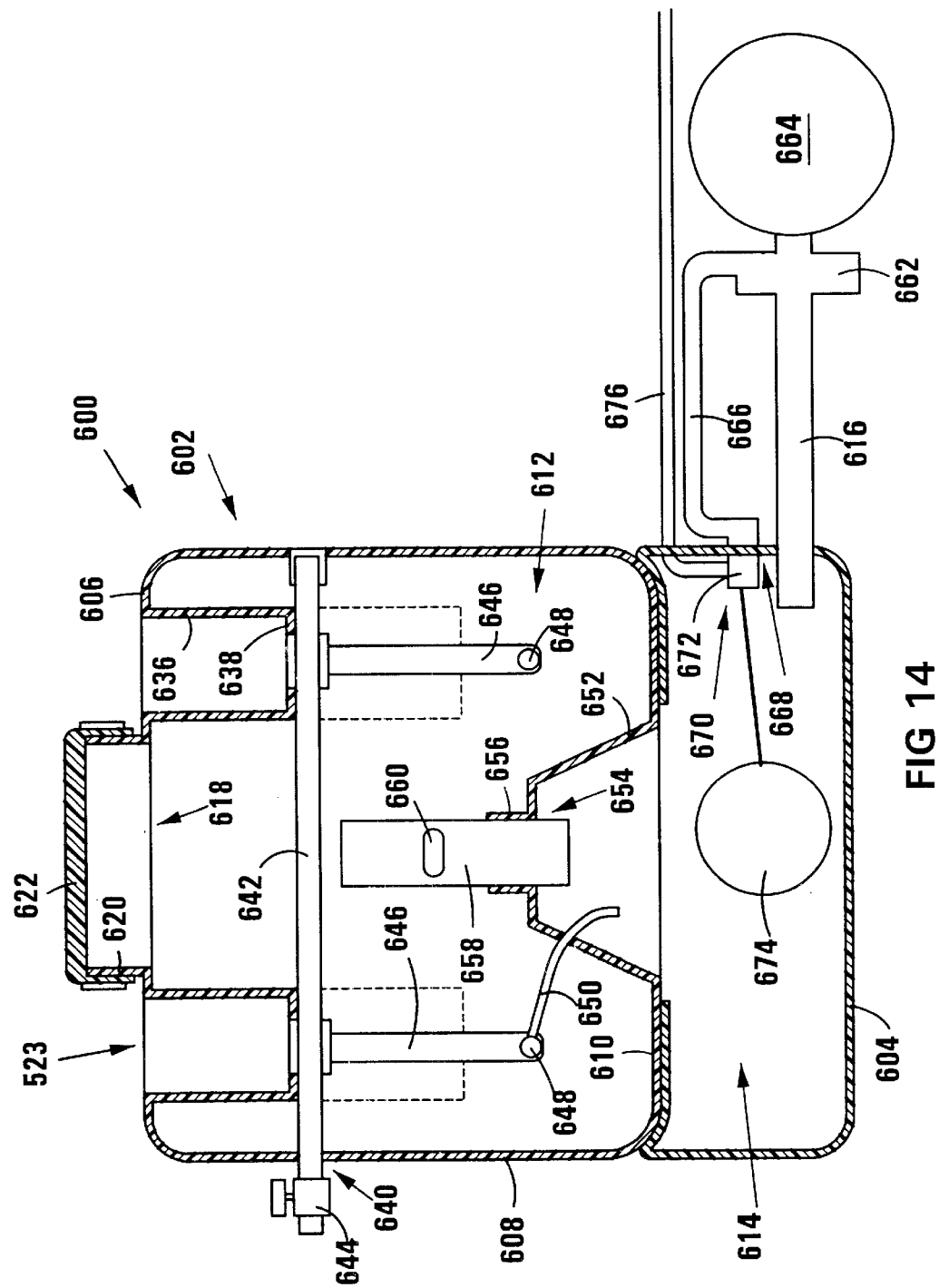
FIG. 14 shows a cross-sectional view through XIII—XIII in FIG. 13.

Referring to FIGS. 13 and 14, reference numeral 600 generally indicates water treatment means for use in a water treatment installation according to an eighth embodiment of the invention.

The installation 600 comprises a water treatment vessel, generally indicated by reference numeral 602. The water treatment vessel 602 comprises a circular base 604 and a circular roof 606 spaced from the base 604. A peripheral wall 608 connects the base 604 to the roof 606. A barrier 610 separates the inside of the vessel into an upper water treatment zone 612 as well as a lower treated water zone 614. An outlet conduit 616 leads through the vessel wall 608, from the treated water zone 614, and thus provides a water outlet from the vessel 602.

The roof 606 is provided with a central opening 618 defined by an upwardly protruding collar 620 having an external screw thread. A lid or cap 622, having a complementary internal screw thread, closes off the opening 618.

Six cartridge openings 624 are provided in the roof 606, and a sleeve 636 depends downwardly from the roof 606 around each of the openings 624. Each sleeve 636 is provided with a radially inwardly protruding peripheral lip 638 at its lower end. Each of the sleeves 636 can thus accommodate a water treatment substance cartridges (not shown).

Each water treatment substance cartridge comprises a cylindrical container whose operatively upper end is closed off. The operatively lower end of the cartridge is open. In proximity to the lower end of the cartridge is provided a plurality of radially inwardly protruding spokes. The spokes slant inwardly upwardly, and are mounted to an annular ring which is located in a circumferential recess in the container. A locating formation extends peripherally and radially outwardly from the container and rests on the lip, thereby locating the cartridge in position. A plurality of calcium hypochlorite tablets are provided inside the container. The cartridges are thus similar to the cartridges 240 hereinbefore described.

The wall 608, within the water treatment zone 612, is provided with a water inlet 640, through which leads a branch water conduit 642. The branch water conduit 642 leads from a bulk conduit (not shown), downstream of a pump (not shown) located in the bulk conduit. The conduit 642 is fitted with a solenoid valve 644, which is operatively connected to the pump motor (not shown) so that the solenoid valve only opens when the pump runs. The conduit 642 is also fitted with a valve (not shown) for regulating the flow of water through the conduit 642, as well as a pressure gauge (not shown).

The branch conduit 642 extends diametrically across the vessel 602, and is provided with two downpipes 646 to the lower ends of which are fitted nozzles 648. The nozzles 648 are arranged at an angle such that water entering the vessel through them causes swirling or rotation, eg in a clockwise direction, of water inside the vessel 602.

A weep tube 650 is attached to the lower end of one of the downpipes 646 and leads into the treated water zone 614 to ensure that, when the apparatus is not in use, water in the water treatment zone 612 will drop from the normal level to a lower level so as to be clear of the lower ends of cartridges located in the sleeves 636.

The barrier 610 includes a raised central portion 652 in which is located a central opening 654. The barrier 610 also comprises a sleeve 656 protruding upwardly around the opening 654. A cylindrical component 658 is slidably located within the sleeve 656. The cylindrical component 658 thus comprises a cylindrical wall having an open upper end and an open lower end. A water inlet 660 is provided in the wall. Thus, by sliding the cylindrical component 658 up and down within the sleeve 656, the water level can be controlled at a desired height within the water treatment zone 612 since water passes through the inlet 660 and through the lower end of the cylindrical component 658, into the treated water zone 614.

The number of cartridges used in the water treatment means 600 can be used to control the water dosage level.

Thus, for example, by using two cartridges rather than one cartridge, a doubling of the dosage level can be achieved.

The tube or conduit 616 leads to the suction side or inlet of a centrifugal pump 662 which is driven by an electrical motor 664. A conduit 666 leads from the pump outlet or discharge to a water inlet 668 in the vessel wall 608, within the treated water zone 614. To the water inlet 668 and the end of the conduit 666 located therein is fitted a float operated valve, generally indicated by reference number 670. The valve 670 has a body 672 whose inlet is thus connected to the water inlet 668, and a float 674 which operates a valve arrangement (not shown) inside the body 672. The valve 670 is thus similar to a cistern valve. A discharge conduit 676 leads from an outlet of the valve body 672 through a suitable opening in the vessel wall 608.

In use, water to be treated is pumped along the bulk water supply conduit, while a slipstream of water is withdrawn through the branch conduit 642 into the vessel 602. Since the lower end of the cartridges protrude into the water in the zone 612 of the vessel, the water is dosed with chlorine as the calcium hypochlorite tablets in the cartridges dissolve. Treated water flows through the water inlet 660 of the cylindrical component 658, and is discharged into the treated water zone 614.

The dosage rate of the water is controlled primarily by varying the level of the water inlet 660 of the cylindrical component 658. However, it is also influenced by the degree of turbulence obtained by means of the nozzles 648, the size and design of the nozzle 648, the angle at which the nozzles are located, the flow rate through the branch conduit 642, and the discharge rate from the vessel 602. The water flow rate along the bulk or primary water conduit can also be used to control the dosage rate.

Treated water is discharged at high pressure, due to the pump 662, through the conduit 676.

The valve 670 thus compensates for water flow variation, ie water surges and pressure drops. As the water level in the zone 614 drops, the valve 670 shuts off gradually and as the water level in the zone 614 rises, the valve opens further allowing the pump 662 to draw a greater volume. The high pressure centrifugal pump 662 is thus choked on the delivery side as it is not practicable to choke such a pump on the suction side.

This installation is thus used to pump water back into a high pressure line, eg the bulk supply line or conduit, when it is at high pressure.

What is claimed is:
1. Water treatment means which includes a water treatment vessel having a base; a roof spaced from the base; a wall extending peripherally between the base and the roof; a barrier separating the vessel into an upper water treatment zone which, in use, will contain a volume of water to be treated, and a lower treated water zone below the barrier; and a water transfer passageway in the barrier;
   cartridge holding means in the vessel roof;
   a water treatment cartridge located in the cartridge holding means, the water treatment cartridge having a lower end which is open such that water can enter it and which is located a distance from the vessel base;
   a water outlet leading from the vessel, with the water outlet located below the lower end of the cartridge;
   a water inlet leading into the vessel;
   a nozzle fitted to the water inlet such that, in use, it is located inside the volume of water to be treated, with the nozzle being adapted to impart swirling or rota- tional motion to the water in the vessel as fresh water is introduced through the nozzle; and a cylindrical component slidingly located in the water transfer passageway in the barrier, the cylindrical component having a water inlet above the barrier and a water outlet below the barrier, so that the level of the water inlet, and hence the level of water in the water treatment zone, can be varied by sliding the cylindrical component up or down in the passageway.

2. Water treatment means according to claim 1 wherein the base and roof are circular so that the wall is of annular form, with the cartridge holding means comprising a circular opening in the vessel roof.

3. Water treatment means according to claim 1, wherein the water treatment cartridge includes a plurality of inwardly directed spokes at or near the operatively lower end of the cartridge, with a plurality of water treatment substance tablets, located one above the other, being provided in the cartridge, so that a lowermost of the water treatment substance tablets rests on the spokes.

4. Water treatment means which includes:

a water treatment vessel having a base, a roof spaced from the base; a wall extending peripherally between the base and the roof; a barrier separating the vessel into an upper water treatment zone which, in use, will contain a volume of water to be treated, and a lower treated water zone below the barrier; and a water transfer passageway in the barrier, with the water transfer passageway having an inlet which is at a higher level than the barrier;

cartridge holding means in the vessel roof;

a water treatment cartridge located in the cartridge holding means, the water treatment cartridge having a lower end which is open, such that water can enter it and which is located above the inlet of the water transfer passageway;

a water outlet leading from the treated water zone of the vessel, a water inlet leading into the water treatment zone of the vessel; and a nozzle fitted to the water inlet such that, in use, it is located inside the volume of water to be treated, with the nozzle being adapted to impart swirling or rotational motion to the water in the water treatment zone as fresh water is introduced through the nozzle.

5. Water treatment means according to claim 4, wherein the base and roof are circular so that the wall is of annular form, with the cartridge holding means comprising a circular opening in the vessel roof.

6. Water treatment means according to claim 4, wherein the water treatment cartridge includes a plurality of inwardly directed spokes at or near the operatively lower end of the cartridge, with a plurality of water treatment substance tablets, located one above the other, being provided in the cartridge, so that a lowermost of the water treatment substance tablets rests on the spokes.

\* \* \* \* \*